United States Patent [19]

Auf Der Heide et al.

[11] Patent Number: 5,928,738
[45] Date of Patent: Jul. 27, 1999

[54] SHIRRED STICK PACKAGING CASING

[75] Inventors: Christian Auf Der Heide, Osnabrueck; Dirk Auf Der Heide, Alfhausen; Klaus-Dieter Hammer, Mainz; Karl Stenger, Ruedesheim, all of Germany

[73] Assignee: Kalle Nalo GmbH, Wiesbaden, Germany

[21] Appl. No.: 08/880,460

[22] Filed: Jun. 24, 1997

[30] Foreign Application Priority Data

Jun. 24, 1996 [DE] Germany ............................ 196 25 094

[51] Int. Cl.⁶ ............................... A22C 13/02; A23L 1/31
[52] U.S. Cl. ...................... 428/34.8; 428/910; 138/118.1; 206/802; 426/105; 426/129; 426/133; 426/277; 426/323; 426/326; 426/335; 426/532; 156/244.13; 156/244.24; 427/421
[58] Field of Search ................................. 428/34.8, 35.7, 428/910; 206/802; 138/118.1; 426/35, 105, 129, 133, 135, 138, 277, 323, 326, 335, 532; 156/244.13, 244.24; 427/421

[56] References Cited

U.S. PATENT DOCUMENTS

| 3,798,302 | 3/1974 | Kostner et al. | 264/310 |
|---|---|---|---|
| 3,834,920 | 9/1974 | Rose | 106/267 |
| 4,303,711 | 12/1981 | Erk et al. | 428/36 |
| 4,560,520 | 12/1985 | Erk et al. | 264/22 |
| 4,601,929 | 7/1986 | Erk et al. | 428/36 |
| 4,659,599 | 4/1987 | Strutzel | 428/36 |
| 4,897,295 | 1/1990 | Erk et al. | 428/34.8 |
| 5,326,613 | 7/1994 | Stenger | 428/34.8 |
| 5,399,427 | 3/1995 | Stenger et al. | 428/348 |
| 5,573,797 | 11/1996 | Wilhoit | 426/106 |
| 5,573,800 | 11/1996 | Wilhoit | 426/326 |
| 5,573,801 | 11/1996 | Wilhoit | 426/326 |

FOREIGN PATENT DOCUMENTS

| 2090925 | 9/1993 | Canada . |
|---|---|---|
| 0 302 571 | 2/1989 | European Pat. Off. . |
| 0 573 306 A2 | 12/1993 | European Pat. Off. . |
| 0 640 289 A2 | 3/1995 | European Pat. Off. . |
| 2 035 198 | 6/1980 | United Kingdom . |
| 1 572 266 | 7/1980 | United Kingdom . |

*Primary Examiner*—Rena L. Dye
*Attorney, Agent, or Firm*—Foley & Lardner

[57] ABSTRACT

The invention relates to a biaxially stretch-oriented and heat-set, single-layer or multilayer shirred stick, polyamide-based packaging casing which has a shirring density of up to 1:200, at a length of the shirred stick of from 40 to 100 cm, and to a process for producing the packaging casing.

25 Claims, No Drawings

SHIRRED STICK PACKAGING CASING

BACKGROUND OF THE INVENTION

1. Field of the Invention

The invention relates to a stick packaging casing (concertina) based on polymer blends, and in particular to a synthetic, polyamide-based sausage casing which has been shirred from biaxially stretch-oriented and heat-set tube material.

2. Description of Related Art

Numerous plastic films for packaging foodstuffs which can be filled as a paste or melt are already known. As a rule, such plastic films are produced from polyethylene terephthalate (PET), polyvinylidene chloride (PVDC) and polyamide (PA). Biaxially stretched PET casings are, however, unsuitable for cooked and scalded sausages, since they are not very stretchable and they shrink only to a small extent. Although PVDC casings are substantially more stretchable, they generally lose their shape after filling more readily. This is particularly the case when sausages filled with these sort of casings are hung up for a prolonged period. Polyamide casings are more stretchable, shrink more and are therefore generally more suitable for cooked and scalded sausages.

DE-A 2 850 182 and GB-A 2 035 198 describe a single-layer casing, which has been shrinkably stretched in the longitudinal and transverse directions and heat-set. The casing is formed of an aliphatic polyamide having a glass transition point in the dry state of at least 48° C., which is reduced at least to 3° C. on absorption of moisture. Polyamide-6 (polycaprolactam), polyamide-7 [poly(7-aminoheptanoic acid lactam) or poly(x-enanthic acid lactam)], polyamide-6,6 (polyamide of hexamethylenediamine and adipic acid) and polyamide-6,10 [polyamide of hexamethylenediamine and decanedioc acid (sebacic acid)] are actually disclosed as possible polyamides.

A similar casing is also described in DE-A 2 850 181 and GB-A 2 035 198. It is composed of a polymer blend which, in addition to the aliphatic polyamide, also contains an ionomer resin, a modified ethylene/vinyl acetate copolymer and/or a quaternary polymer with units of ethylene, butylene, an aliphatic, ethylenically unsaturated ($C_3$–$C_5$)-carboxylic acid and an ester of this carboxylic acid with ($C_1$–$C_8$)-alcohols. After initial cutting, it is disclosed that the casing shows a reduced tendency for tear propagation. These casings are used for cooked and scalded sausages. However, the sausage meat must be filled in under a pressure of from about 0.3 to 0.6 bar, in order to stretch the casing.

Since the sausage meat loses volume after scalding, the casing must compensate this loss, so that it fits closely without creases, i.e., it must shrink to the same extent as its contents. The known casings, however, are generally shrinkable only to a limited extent and are therefore stretched during the filling step. Thus, the necessary filling pressure is generally at the limit of what is possible with the known sausage-filling machines. In the case of manual filling, the pressure is so low that such casings would detach themselves from the sausage meat, in other words, the casing separates, and will form creases, which would cause the sausage to appear unattractive and no longer fresh in the eyes of the consumer.

A single-layer sausage casing of a polyamide, which can absorb at least 5% of its weight of water, is disclosed in DE-A 3 227 945, U.S. Pat. No. 4,560,520 and U.S. Pat. No. 4,601,929. It shows a reduced tendency to tear propagation after initial cutting than the sausage casing known from DE-A 2 850 182. Starting materials for this casing are preferably polyamide-6 and polyamide-6,6. It is produced by extrusion, stretching of the extruded tube in the longitudinal and transverse directions and subsequent complete heat-setting under controlled shrinkage. The controlled shrinkage amounts to 15% to about 40% in each direction, as a rule about 20%. Even here, the casing must be expanded by elevated pressure during filling, if it is to remain free of creases later.

The mechanical properties of stretched polyamide casings depend greatly on their water content. A minimum water content is generally necessary to keep the casings sufficiently stretchable and supple during filling operations. However, water and water vapor increase the water content during scalding to such an extent that the mechanical properties of the casings can become adversely affected.

A polyamide-based single-layer casing for cooked and scalded sausages, which retains its shape even during scalding, is disclosed in EP-A 0 176 980 and U.S. Pat. No. 4,659,599. It is composed of a mixture of polyamide and polyester. The polyamide is a saturated, linear, aliphatic polyamide, in particular PA-6, and the polyester is a polyterephthalic acid ester and/or a copolyester with units of terephthalic acid and isophthalic acid. Due to the admixture of polyester, the casing is relatively cloudy and shows an unnatural metallic sheen. In addition, its stretchability is low and it must be filled under a comparatively high pressure if it is to be free of creases.

The single-layer, biaxially stretch-oriented and heat-set sausage casing according to DE-A 3 943 024 and U.S. Pat. No. 5,326,613 is clear as glass, has no metallic or mother-of-pearl like sheen and shows a high resilience. It is produced from a polymer blend composed of polycaprolactam (polyamide-6) and an aromatic copolyamide of units of hexamethylenediamine, terephthalic and isophthalic acids. This casing is again most specifically intended for filling by machine under pressure. It is less suitable for manual filling, because in most cases it is not sufficiently supple.

In EP-A 0 573 306, a tubular, multi-layered, biaxially stretched, shrinkable sausage casing is described. The casing contains a layer of a polymer blend composed of polyamide-6 and at least 5% by weight of a copolyamide (for example PA-6,12 or PA-6/69). This layer is surrounded by other layers, especially by polyolefin layers. The polyamide layer is relatively thin as compared with the polyolefin layers. The foodstuffs casings actually disclosed in EP-A 0 573 306 all have six layers.

SUMMARY OF THE INVENTION

It is an object of the invention to provide a shirred stick packaging casing, especially for sausage rings, which has, in the unshirred state, a length of from 50 to 100 m, can be shirred very densely and can immediately be filled with sausage meat by machine without soaking in water.

In accomplishing these and other objectives, there is provided in accordance with one aspect of the invention a shirred stick packaging casing comprising a polyamide-based polymer blend tube material which has been shirred from biaxially stretch-oriented and optionally heat-set tube material to form a shirred stick, wherein a spray solution containing an emulsifier has been applied before shirring to the tube material, wherein the shirring density of said shirred stick is up to 1:200 and the length of the shirred stick is 40 to 100 cm, and wherein the shirred stick has an external diameter of from 25 to 90 mm and an internal diameter of from 12 to 45 mm.

In accordance with another aspect of the invention, there is provided a process for producing a single-layer or multilayer packaging casing comprising: producing a homogeneous melt from a polyamide blend material for at least one of the layers of the casing; extruding the melt through an annular die to form a seamless tube; subsequently stretching the tube in the longitudinal and transverse directions and optionally heat-setting it to produce a casing; treating the biaxially stretched casing with a spray solution emulsifier; and shirring the treated casing to form a stick.

Additional objects, features and advantages of the invention will be set forth in the description which follows, and in part will be obvious from the description, or may be learned by practice of the invention. The objects, features and advantages of the invention may be realized and obtained by means of the instrumentalities and combinations particularly pointed out in the appended claims.

DETAILED DESCRIPTION OF PREFERRED EMBODIMENTS

In accordance with the present invention, there is provided a shirred stick packaging casing based on polyamide which has been shirred from biaxially stretch-oriented and heat-set tube material, wherein a spray solution containing an emulsifier has been applied before the shirring to the tube material, wherein the shirring density is from 1:50 up to 1:200 and the length of the shirred stick is preferably from 40 to 100 cm, and wherein the shirred stick has an external diameter of preferably from 25 to 90 mm and an internal diameter of preferably from 12 to 45 mm.

During the scalding (which is generally carried out in practice at a temperature of about 80° C.) the strength of the casing should generally not decrease to such an extent that it bursts or tears. During cooling, the casing preferably should shrink with the contents without separation or even without the formation of creases. At the same time, this generally prevents sausage jelly from collecting underneath the casing. In addition, the casing should generally have such an amount of tension that the sausage gives the impression of being plump and fresh. It should be sufficiently supple and have a soft handle, so that it is also suitable for manual filling of the sausage (at a pressure which is reduced as compared with filling by machine). A metal clip normally used for closing the sausage ends should be fixed on the casing without sliding, to the extent possible, i.e., the casing should preferably have a high coefficient of friction with respect to metal. The casing should also preferably have a low permeability for water vapor and oxygen, in order to reduce the weight loss during storage and prevent spoilage due to oxidation. In general, the casing may be colored by colored pigments or dyes, but it can also be transparent and have an attractive sheen, since sausages in a cloudy or milky casing are typically not highly regarded by the consumer. Finally, the casing should preferably be easy to produce from inexpensive raw materials.

In a preferred manner, the tube material contains a polymer blend of polyamide-6 and 10 to 90% by weight of a copolyamide of units of hexamethylenediamine, isophthalic and terephthalic acids. In particular, the tube material preferably contains a polymer mix of polyamide-6 and 10 to 30% by weight of a copolyamide.

In a further embodiment of the invention, the tube material preferably comprises:
a) polyamide-6,
b) 5 to 50% by weight, relative to the total weight of all the polymers in the layer, of an $b_1$) aliphatic copolyamide with units of the formulae —NH—$[CH_2]_5$—CO— and —NH—$[CH_2]_m$—CO—, m being an integer from 7 to 11, and/or of an $b_2$) aliphatic copolyamide with units of the formulae —NH—$[CH_2]_5$—CO—, —NH—$[CH_2]_n$—NH— and —CO—$[CH_2]_o$—CO—, n being an integer from 6 to 12 and o being an integer from 7 to 10, if appropriate, optionally, c) up to 20% by weight of an amorphous copolyamide with units of hexamethylenediamine, terephthalic and isophthalic acids and, if appropriate, optionally, d) up to 20% by weight of a polyolefin modified with carboxyl groups.

The total of the percent by weight of the components a) to d) may be equal to 100, if none of the constituents mentioned below are added.

The molar ratio between the units of the formula —NH—$[CH_2]_5$—CO— and those of the formula —NH—$[CH_2]_m$—CO— in the aliphatic copolyamide $b_1$) is preferably from 95:5 to 20:80, particularly preferably from 60:40 to 30:70. The molar ratio between units of the formula —NH—$[CH_2]_5$—CO— and those of the formulae —NH—$[CH_2]_n$—NH— and —CO—$[CH_2]_o$— CO— in the aliphatic copolyamides $b_2$) is preferably from 95:5 to 25:75, particularly preferably from 70:30 to 30:70. The units of the formulae —NH—$[CH_2]_n$—NH— and —CO—$[CH_2]_o$—CO— are preferably present in virtually equimolar amounts.

In the aliphatic copolyamides $b_1$), m is preferably 7 or 11, i.e., the units of the formula —NH—$[CH_2]_m$—CO— are preferably those of 8-amino-octanoic acid (=8-amino-caprylic acid) or 12-amino-dodecanoic acid (=12-amino-lauric acid).

In the aliphatic copolyamides $b_2$), n is preferably 6 and o is preferably 7, 8 or 10, i.e., the units of the formula —NH—$[CH_2]_n$—NH— are preferably those of hexane-1,6-diyldiamine (hexamethylenediamine) and the units of the formula —CO—$[CH_2]_o$—CO— are preferably those of nonanedioc acid (azelaic acid), decanedioic acid (sebacic acid) or dodecanedioc acid. The copolyamide of hexamethylene-diamine and azelaic acid is generally designated polyamide-69 (or polyamide-6,9), that of hexamethylenediamine and sebacic acid is designated polyamide-610 (or polyamide-6,10) and that of hexamethylenediamine and dodecanedioc acid is designated polyamide-612 (or polyamide-6,12). Finally, the copolyamide with units of e-caprolactam, hexamethylenediamine and azelaic acid is designated polyamide-6/69. Casings containing the component $b_2$) show a particularly good transparency.

The proportion of the component b) is preferably 10 to 30% by weight and that of the amorphous copolyamide c)—partially aromatic due to the units of terephthalic and isophthalic acids—is preferably 5 to 15% by weight, each relative to the total weight of all the polymers in the layer. Copolyamides with units of hexamethylenediamine and units of terephthalic and/or isophthalic acids may be designated in short PA-6-T and PA-6-I respectively.

The polyolefin d) modified with carboxyl groups is preferably a copolymer with units of ethylene and (meth)acrylic acid. (Meth)acrylic acid here represents acrylic acid and methacrylic acid. The (meth)acrylic acid units are present therein preferably in a proportion of from 2 to 25% by weight. The proportion of component d) is preferably likewise 5 to 15% by weight, again relative to the total weight of the polymers in the layer. Inter alia, the components c) and d) tend to effect the reduced permeability of the casing for oxygen and water vapor.

The packaging casing according to the invention in general may also contain dyes, pigments and/or processing aids. The proportion of these constituents, if employed, should preferably be relatively small, so that the essential properties of the packaging casing are virtually unaffected thereby.

In one embodiment, the packaging casing according to the invention contains 40 to 80% by weight of the component a), 10 to 30% by weight of the component b) and 5 to 15% by weight each of the components c) and d). The optimum ratio of the components also depends, among other things, on the diameter of the packaging casing, on its wall thickness and on its ultimate use.

As compared with a casing of pure polyamide-6, the shirred stick packaging casing of the present invention tends to have a substantially higher suppleness and a better "handle". After cooling, it generally surrounds the scalded sausages substantially more tautly than has been usual hitherto, even though the shrinkage tension (measured in the transverse direction in the dry state at 100° C.) is generally reduced as compared with conventional casings.

According to the invention, the shirred stick packaging casing preferably contains more than one layer as described above. In particular, two to five such layers are envisaged for the tube material.

According to the invention, a process for producing a single-layer or multilayer packaging casing is provided. In this process, the components forming the casing or the individual layers of the casing are converted into a homogeneous melt. The melt is extruded through one or more annular dies and thus formed to give a seamless tube which is then stretched in the longitudinal and transverse directions. The process comprises producing at least one layer of the packaging casing from the above-mentioned polymer blend and treating the packaging casing with a spray solution containing an emulsifier before the shirring to give a stick. The mixing and melting, if desired, can be carried out in a separate mixing extruder. The seamless tubular film produced by extrusion is generally stretched by the pressure of a gas filled into the interior (air in the normal case) and by applying a tensile force in the longitudinal direction (for example by using a pair of rollers) in the longitudinal and transverse directions. This process, called "blow-molding", is generally known to those skilled in the art. As a result of the stretching, the casing obtains a substantially higher strength. In order to reduce the shrinkage arising under the action of heat, the tubular film may be partially fixed by an additional heat treatment ("heat-setting"). The finished packaging casing generally shows a shrinkage of from 5 to 25% in the longitudinal and transverse directions in hot water at 80° C. The thickness of the stretched and heat-set packaging casing is preferably generally 10 to 50 $\mu$m, most preferably 25 to 45 $\mu$m.

For special applications, the packaging casing according to the invention can also be a multilayer casing. If the casing is multilayer, it preferably comprises at least one layer of the polyamide blend indicated above. The further layers are preferably composed of polyamides (for example polyamide-6), polyamide mixtures, polyolefins such as polyethylene or polypropylene, or polyolefins provided with adhesion-promoting functional groups, copolymers with units of ethylenically unsaturated monomers (for example, vinyl acetate, vinyl alcohol, acrylic and methacrylic acids) as well as vinylidene chloride or acrylonitrile copolymers, ionomer resins or mixtures of the above-mentioned polymers.

The multilayer casing according to the invention in a preferred embodiment comprises 2 to 5 layers. Preferably, a layer of the above-described polyamide blend is followed by alternating further layers of the polyolefin and polyamide types. Such a casing may be produced by coextrusion employing annular dies specially constructed in accordance with the number of the layers. As is well known, such an arrangement may require a considerably greater investment than an arrangement for producing a single-layer film.

Subsequently, the single-layer or multilayer packaging casing can optionally be provided with an imprint, be sectionally shirred to give sticks or be cut up into smaller pieces and tied off at one end. The short pieces tied off at one end are generally used in manual production of the sausage, whereas the sticks are employed in the production of sausages, in particular of sausage rings, by machine.

The sticks can in this case be slipped over a stuffing horn of a sausage meat-filling machine, without prior soaking in water. The length of the shirred stick is preferably within the range from 40 to 100 cm which, at a shirring density of from 1:50 up to 1:200, means that the length of the unshirred packaging casing is from 50 m up to 200 m. Intermediate shirring densities range between 1:80 and 1:100. The caliber of the unshirred packaging casing is preferably within the range from 20 to 68 mm and is especially about 45 mm. The packaging casing may be designed as a casing ring for sausage rings having an internal diameter of from 160 to 180 mm. Conventional process measures have the result that, during filling, the packaging casing curls sectionally to form a ring.

Preferably, the external diameter of the shirred stick packaging casing is generally from 25 to 90 mm, and the internal diameter is generally from 12 to 45 mm. The spray solution applied before the shirring of the packaging casing contains, for example, potassium sorbate and lactic acid, whose concentrations in percent by weight are selected such that the spray solution has a pH of less than or equal to 6. About 0.1 to 0.3% by weight of a bactericide as well as a lubricant may also added to the spray solution. Alternatively, 2 to 25% by weight of, for example, glycerol, as the main constituent, a lubricant and a bactericide can be added to the spray solution. Likewise, an oil-in-water emulsion with an emulsifier as a surface-active substance is envisaged as an addition to the spray solution, and this is, for example, a fatty acid ester of sorbitol. The oil used may be, inter alia, a triglyceride. The oil-in-water emulsion is preferably present in an amount from 5 to 10% by weight. The concentration of active ingredients in the spray solution may be preferably from 2 to 25% by weight, most preferably in the range from 5 to 10% by weight. In the examples and comparison examples which follow, the unshirred packaging casings are compared with one another, with p.b.w. representing parts by weight.

EXAMPLES 1 to 3

A homogeneous melt of dry blend mixtures of 90% by weight of polyamide PA-6 (Ultramid B4) and 10% by weight of copolyamide PA 6I/6T (Grivory G21) in Example 1, of 85% by weight of polyamide PA-6 and 15% by weight of copolyamide PA 6I/6T in Example 2, and of 80% by weight of PA-6 and 20% by weight of PA 6I/6T in Example 3 is plasticized in a single-screw extruder at 235° C., extruded via an annular die, and quenched by cooling to give a raw tube of 19 mm diameter and 0.30 mm wall thickness. Subsequently, this tube is heated and subjected to simultaneous biaxial stretching within the stretching zone. In this case, the following stretching ratios are adhered to:

Transverse stretching ratio: 1:3.3
Longitudinal stretching ratio: 1:2.6.

In this way, tubular films of 63 mm diameter are obtained with a wall thickness of 0.035 mm.

In a further process step, the casings are heat-set with the aid of a further vessel, while avoiding longitudinal and transverse shrinkage. These packaging casings thus obtained are hardly still shrinkable below 80° C. or not at all, but they resist tear propagation so that they can be shirred to give sticks.

Packaging casings of this type envelop the sausage filled into them without creasing for a chilled storage period of 6 weeks. After this time, no graying has yet occurred on the sausage surface. There are no jelly pockets; when the sausages are peeled, no adhesion of the sausage meat to the film is observed.

EXAMPLE 4

A mixture of
- 80 p.b.w. of polyamide-6 (the relative viscosity of a 1% by weight solution of the polyamide in 96% sulfuric acid is 4 at 20° C.),
- 10 p.b.w. of polyamide-6/69 (®Grilon CF62BS from Ems-Chemie AG) (melt volume index: 40 ml in 10 minutes at 190° C. and 10 kg load) and
- 10 p.b.w. of ethylene/methacrylic acid copolymer (®Nucrel 0903 HC from DuPont de Nemours Inc.) (melt index: 2.5 g in 10 minutes at 190° C. and 2.16 kg load)

was plasticized in a single-screw extruder at 240° C. to give a homogeneous melt and extruded through an annular die to give a tube of 18 mm diameter. Initially, the polymer tube was cooled down rapidly, then heated to the temperature required for stretching, stretched by the blow-molding process and finally heat-set, the stretching ratio in the longitudinal and transverse directions remaining unchanged. The area stretching ratio was 9.6. The tube had a diameter within the range from 66 to 68 mm.

EXAMPLE 5

A mixture of
- 70 p.b.w. of polyamide-6 (as in Example 4),
- 10 p.b.w. of polyamide-6/69 (as in Example 4),
- 10 p.b.w. of amorphous polyamide 6-I/6-T (®Selar PA 3426 from DuPont de Nemours Inc.) (melt index: 90 g in 10 minutes to 275° C. and a load of 10 kg) and
- 10 p.b.w. of ethylene/methacrylic acid copolymer (as in Example 4)

was processed as described in Example 4 to give a stretched and heat-set packaging casing. The dimensions of the casing were also identical to those of Example 4. In the same way, a tube of 12 mm diameter was extruded and transversely stretched in the ratio of 1:1.66 and subsequently longitudinally stretched, so that an unshirred packaging casing having a caliber of 20 mm was obtained.

EXAMPLE 6

A mixture of
- 60 p.b.w. of polyamide-6 (as in Example 4),
- 20 p.b.w. of polyamide-6/69 (as in Example 4),
- 10 p.b.w. of amorphous polyamide-6-I/6-T (as in Example 5) and
- 10 p.b.w. of ethylene/methacrylic acid copolymer (as in Example 4)

was processed as described to give a biaxially stretched and heat-set packaging casing. Here again, the dimensions of the product were identical.

EXAMPLE 7

A mixture of
- 50 p.b.w. of polyamide-6 (as in Example 4),
- 30 p.b.w. of polyamide-6/69 (as in Example 4),
- 10 p.b.w. of amorphous polyamide-6-I/6-T (as in Example 5) and
- 10 p.b.w. of ethylene/methacrylic acid copolymer (as in Example 4)

was processed as described to give a biaxially stretched and heat-set packaging casing. The area stretching ratio was again 9.6, and the diameter of the finished packaging casing was 66 mm. From the same mixture, a tube having a diameter of 15 mm was extruded and stretched at an area stretching ratio of 9.0. The diameter of the finished unshirred packaging casing was 45 mm, which is a preferred caliber of the packaging casing.

EXAMPLE 8

A mixture of
- 65 p.b.w. of polyamide-6 (as in Example 4),
- 15 p.b.w. of polyamide-612 (®Grillon CF6S from Ems-Chemie AG) (melt index: 50 g in 10 minutes at 190° C. and a load of 10 kg),
- 10 p.b.w. of amorphous polyamide-6-I/6-T (as in Example 5) and
- 10 p.b.w. of ethylene/methacrylic acid copolymer (as in Example 4)

was processed as described to give a biaxially stretched and heat-set packaging casing. The area stretching ratio was 9.2, and the diameter of the finished packaging casing was 63 mm.

EXAMPLE 9

A mixture of
- 50 p.b.w. of polyamide-6 (as in Example 4),
- 30 p.b.w. of polyamide-612 (as in Example 8),
- 10 p.b.w. of amorphous polyamide-6-I/6-T (as in Example 5) and
- 10 p.b.w. of ethylene/methacrylic acid copolymer (as in Example 4)

was processed as described to give a biaxially stretched and heat-set packaging casing. The area stretching ratio was likewise 9.2, and the diameter of the finished packaging casing was 63 mm.

EXAMPLE 10

The following polymer mixtures were used for producing a multilayer packaging casing:

Mixture A:
- 80 p.b.w. of polyamide-6 (as in Example 4),
- 10 p.b.w. of amorphous polyamide-6-I/6-T (as in Example 5) and
- 10 p.b.w. of polyamide-6/6,9 (as in Example 4), Mixture B:
- 70 p.b.w. of low-density polyethylene (®Lupolen 1441D from BASF AG) having a melt index of 0.2 g in 10 minutes at 190° C. and 2.16 kg load and
- 30 p.b.w. of a linear low-density polyethylene (LLDPE) provided by modification with maleic anhydride with a finish promoting adhesion to polyamide (®Escor CTR 2000 from Exxon), having a melt index of 3 g in 10 minutes at 190° C. and 2.16 kg load, and Mixture C:

85 p.b.w. of polyamide-6 (as in Example 4) and 15 p.b.w. of amorphous polyamide-6-I/6-T (as in Example 5).

These mixtures were plasticized in three single-screw extruders at 240° C. in each case to give homogeneous melts, then combined in a three-layer annular die and co-extruded to give a tube of 18 mm diameter. This tube was processed as described to give a biaxially stretched and heat-set packaging casing. The area stretching ratio was 9.6, and the diameter of the finished packaging casing was 66 mm. At a total film thickness of 55 μm, the layers had the following thicknesses:

Outer layer (mixture A): 30 μm

Middle layer (mixture B): 20 μm

Inner layer (mixture C): 5 μm.

It applies quite generally to Examples 1 to 10 that the diameter of the extruded tube can be 12 to 20 mm depending on the diameter of the annular die used for the tube extrusion and that, as a result of the selection of the area stretching ratio within the range from 3.3 to 9.6, the biaxially stretched, heat-set, unshirred packaging casing has a diameter within the range from 20 to 68 mm.

COMPARISON EXAMPLE 1

100% by weight of the same PA-6 (Ultramid B4) as indicated in Examples 1 to 3 is extruded, biaxially stretched and heat-set under the conditions stated there.

The packaging casing thus obtained shows a high permeability for water vapor. A sausage filled into it already is creased after chilled storage for three weeks and is gray on the surface (lack of an oxygen barrier).

COMPARISON EXAMPLE 2

The same PA-6 (Ultramid 4) as indicated in Examples 1 to 3 is mixed in the ratio of 85:15 with a PA 6-3T (Trogamid T) to give a dry blend and extruded, biaxially stretched and heat-set under the conditions stated there.

Although the packaging casing thus obtained shows, in comparison with the casings according to the invention, likewise good mechanical strengths and better cloudiness values even, it produces during the sausage production process such a low residual tension that the sausage is already creased after complete cooling and is thus unsalable. In addition, undesired exudation from the meat (jelly formation) is to be noted.

COMPARISON EXAMPLE 3

In place of the homopolyamide PA-6, a copolyamide PA-6/69 (Grilon XE 322, from EMS-Chemie) is mixed in this experimental batch with PA-6I/6T (Grivory G21) in a ratio of 85:15 and extruded under the conditions indicated in Example 1. In contrast with the preceding examples and comparison examples, no steadily proceeding tube-stretching process is possible in this case, which manifests itself, inter alia, in the wide variation in flat width and the non-uniformity of the wall thickness.

Moreover, as compared with the other examples, the specific strength is reduced. The pieces of tube obtained have a higher elongation at tear and reduced $\sigma_5$ value (poorer constancy of caliber). Such a blend is unsuitable for realizing a biaxially stretch-oriented, industrially usable sausage casing.

COMPARISON EXAMPLE 4

The pure polyamide-6 from Example 4 was processed as described there to give a packaging casing. The area stretching ratio was 9.0.

COMPARISON EXAMPLE 5

A mixture of 80 p.b.w. of polyamide-6 (as in Example 4), 10 p.b.w. of amorphous polyamide-6-I/6-T (as in Example 5) and 10 p.b.w. of ethylene/methacrylic acid copolymer (as in Example 4)

was processed according to Example 4 to give a stretched and heat-set packaging casing. The stretching ratio was 9.0, and the diameter of the finished packaging casing was 61 mm.

COMPARISON EXAMPLE 6

A single-layer sausage casing according to DE-C 2,850, 181 having a nominal diameter of 60 mm (®Betan from Naturin-Werk Becker & Co.) was processed and measured analogously.

COMPARISON EXAMPLE 7

A single-layer sausage casing according to DE-C 2,850, 182 having a nominal diameter of 60 mm (®Optan from Naturin-Werk Becker & Co.) was processed and measured analogously.

The measured values of Examples 4 to 10 and of Comparison Examples V4 to V7 in the following table prove the superiority of the casings according to the invention over the state of the art.

Explanation of the Footnotes

1) The tear strength was measured according to DIN 53455 on 15 mm wide strips, soaked in water for 30 minutes, of a clamped length of 50 mm.

2) In this case, the percentage increase in the outer circumference of tube sections was determined, which had been soaked in water beforehand for 30 minutes and then inflated until the internal pressure indicated was reached.

3) The casing was subjected from one end with air of a relative humidity (r.h.) of 85% at 20° C. The water vapor permeability was measured according to DIN 53122.

4) The $O_2$ permeability was measured according to DIN 53380 at 53% r.h. and 23° C.

5) A casing soaked in water for 30 minutes was assessed by subjective impression. The figures given have the following meaning: 1=extremely soft, 2=very soft, 3=soft and 4=moderate.

6) Change in dimensions after 15 minutes' storage in water at 80° C.

7) The shrinkage strain was measured on dry, 15 mm wide strips which had been clamped for 3 minutes at 100° C. and 0° C. r.h. between two measuring clamps at a distance of 100 mm. This distance remained unchanged.

8) The casing was manually filled with fine-grained scalding sausage meat at constant filling pressure and sealed with metal clips. The sausages were then cooked in a scalding cabinet for 60 minutes at 78° C. and 100% r.h. The appearance and consistency were assessed after cooling to 7° C.

TABLE

| Example No. | Film thickness μm | Tear strength 1) N/mm² longit. | Tear strength 1) N/mm² transv. | Transverse elongation 2) in % at 25 KPa | Transverse elongation 2) in % at 50 KPa | Water vapor permeability 3) g/m²·day | $O_2$ permeability 4) cm³/m²·day·bar | Flexibility 6) | Shrinkage 6) transverse, in % | Shrinkage strain 7) transverse N/mm² | Result of filling trial 8) |
|---|---|---|---|---|---|---|---|---|---|---|---|
| 4 | 35 | 168 | 59 | 8.5 | 18.5 | 12.0 | 16.9 | 2 | 25 | 9.4 | crease-free plump |
| 5 | 37 | 125 | 41 | 9.5 | 19.0 | 11.5 | 13.6 | 2 | 26 | 10.2 | crease-free very plump |
| 6 | 36 | 131 | 52 | 10.5 | 21.0 | 13.1 | 16.5 | 1 | 26 | 8.5 | crease-free plump |
| 7 | 33 | 124 | 53 | 13.0 | 24.0 | 12.1 | 18.5 | 1 | 24 | 5.6 | crease-free plump |
| 8 | 35 | 122 | 38 | 10.0 | 20.0 | 11.6 | 14.1 | 2 | 26 | 10.4 | crease-free plump |
| 9 | 36 | 114 | 35 | 12.5 | 23.0 | — | — | 2 | 25 | 7.3 | crease-free plump |
| 10 | 55 | 118 | 42 | 8.0 | 18.5 | 3.1 | 14.0 | 2 | 23 | 7.1 | crease-free very plump |
| V4 | 35 | 186 | 68 | 8.0 | 18.0 | 26.3 | 18.1 | 3 | 24 | 10.2 | creased |
| V5 | 37 | 130 | 41 | 6.5 | 15.0 | 12.2 | 14.0 | 4 | 26 | 11.0 | slightly creased |
| V6 | 40 | 150 | 180 | 7.5 | 12.8 | 16.0 | 17.0 | 4 | 12 | — | creased |
| V7 | 50 | 200 | 200 | 4.0 | 9.5 | 25.0 | — | 4 (rigid) | 3 | — | creased |

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document, German application serial no. 196 25 094.3 filed Jun. 24, 1996, is incorporated herein in its entirety including the title, abstract, specification and claims.

What is claimed is:

1. A shirred stick packaging casing comprising a polyamide-based polymer blend tube material which has been shirred from biaxially stretch-oriented and optionally heat-set tube material to form a shirred stick, wherein a spray solution containing an emulsifier has been applied before shirring to the tube material, wherein the spray solution comprises an oil-in-water emulsion with said emulsifier, and said emulsifier is based on a fatty acid ester of sorbitol, wherein the oil is a triglyceride, wherein the shirring density of said shirred stick is from 1:50 up to 1:200 and the length of the shirred stick is 40 to 100 cm, and wherein the shirred stick has an external diameter of from 25 to 90 mm and an internal diameter of from 12 to 45 mm.

2. A shirred stick packaging casing as claim 1, wherein the spray solution contains the oil-in-water emulsion in an amount from 2 to 25% by weight.

3. A shirred stick packaging casing as claimed in claim 1, wherein the concentration of the oil-in-water emulsion in the spray solution is 5 to 10% by weight.

4. A shirred stick packaging casing as claimed in claim 1, wherein the spray solution comprises potassium sorbate and lactic acid and the spray solution has a pH less than or equal to 6.

5. A shirred stick packaging casing as claimed in claim 4, wherein said spray solution comprises a bactericide in a concentration of from 0.1 to 0.3% by weight and a lubricant.

6. A shirred stick packaging casing as claimed in claim 1, wherein the oil-in-water emulsion amounts to 5 to 10% by weight of the spray solution.

7. A shirred stick packaging casing as claimed in claim 1, wherein the tube material in an unshirred state has a caliber of 20 to 68 mm, and, when being filled with sausage meat, curls to form a casing ring for sausage rings.

8. A shirred stick packaging casing as claimed in claim 1, wherein the tube material in an unshirred state has a caliber of 45 mm.

9. A shirred stick packaging casing as claimed in claim 1, wherein the tube material comprises a polymer blend of polyamide-6 and 10 to 90% by weight of a copolyamide of units of hexamethylenediamine, isophthalic and terephthalic acids.

10. A shirred stick packaging casing as claimed in claim 9, wherein the tube material contains a polymer blend of polyamide-6 and 10 to 30% by weight of said copolyamide.

11. A shirred stick packaging casing as claimed in claim 1, wherein the tube material comprises:
a) polyamide-6,
b) 5 to 50% by weight, relative to the total weight of all the polymers in the layer, of an
  $b_1$) aliphatic copolyamide with units of the formulae —NH—[CH$_2$]$_5$—CO— and —NH—[CH$_2$]$_m$—CO—, m being an integer from 7 to 11, and/or of an
  $b_2$) aliphatic copolyamide with units of the formulae —NH—[CH$_2$]$_5$—CO—, —NH—[CH$_2$]$_n$—NH— and —CO—[CH$_2$]$_o$—CO—, n being an integer from 6 to 12 and o being an integer from 7 to 10,
optionally, c) up to 20% by weight of an amorphous copolyamide with units of hexamethylenediamine, terephthalic and isophthalic acids and, optionally, d) up to 20% by weight of a polyolefin modified with carboxyl groups.

12. A shirred stick packaging casing as claimed in claim 11, wherein the molar ratio between the units of the formula —NH—$[CH_2]_5$—CO— and those of the formula —NH—$[CH_2]_m$—CO— in the aliphatic copolyamide $b_1$) is from 95:5 to 20:80.

13. A shirred stick packaging casing as claimed in claim 11, wherein the molar ratio between the units of the formula —NH—$[CH_2]_5$—CO— and those of the formula —NH—$[CH_2]_m$—CO— in the aliphatic copolyamide $b_1$) is from 60:40 to 30:70.

14. A shirred stick packaging casing as claimed in claim 11, wherein the molar ratio between the units of the formula —NH—$[CH_2]_5$—CO— and those of the formulae —NH—$[CH_2]_n$—NH— and —CO—$[CH_2]_o$—CO— in the aliphatic copolyamides $b_2$) is from 95:5 to 25:75.

15. A shirred stick packaging casing as claimed in claim 11, wherein the molar ratio between the units of the formula —NH—$[CH_2]_5$—CO— and those of the formulae —NH—$[CH_2]_n$—NH— and —CO—$[CH_2]_o$—CO— in the aliphatic copolyamides $b_2$) is from 70:30 to 30:70.

16. A shirred stick packaging casing as claimed in claim 11, wherein in the aliphatic copolyamides $b_1$) m is 7 or 11.

17. A shirred stick packaging casing as claimed in claim 11, wherein in the aliphatic copolyamides $b_2$) n is 6 and o is 7, 8 or 10.

18. A shirred stick packaging casing as claimed in claim 11, wherein the proportion of the component b) is 10 to 30% by weight, that of the component c) is 5 to 15% by weight and that of the component d) is also 5 to 15% by weight, each relative to the total weight of all the polymers in the layer.

19. A shirred stick packaging casing as claimed in claim 11, wherein the polyolefin d) modified with carboxyl groups is a copolymer with units of ethylene and (meth)acrylic acid.

20. A shirred stick packaging casing as claimed in claim 11, which comprises more than one layer.

21. A shirred stick packaging casing as claimed in claim 11, wherein the percent by weight of the components a) to d) is equal to 100.

22. A shirred stick packaging casing as claimed in claim 20, wherein a layer of a polyamide blend is followed by alternating further layers of at least one of polyolefin and polyamide.

23. A process for producing a single-layer or multilayer packaging casing as claimed in claim 1, comprising:

producing a homogeneous melt from a polyamide blend material for at least one of the individual layers of the casing;

extruding the melt through an annular die to form a seamless tube;

subsequently stretching the tube in the longitudinal and transverse directions and optionally heat-setting said tube to produce a casing;

treating the casing, prior to the shirring step, with a spray solution containing an emulsifier; and shirring the treated casing to form a stick.

24. A process as claimed in claim 23, wherein said at least one layer comprises:

a) polyamide-6, b) 5 to 50% by weight, relative to the total weight of all the polymers in the layer, of an $b_1$) aliphatic copolyamide with units of the formulae —NH—$[CH_2]_5$—CO— and —NH—$[CH_2]_m$—CO—, m being an integer from 7 to 11, and/or of an $b_2$) aliphatic copolyamide with units of the formulae —NH—$[CH_2]_5$—CO—, —NH—$[CH_2]_n$—NH— and —CO—$[CH_2]_o$—CO—, n being an integer from 6 to 12 and o being an integer from 7 to 10, optionally, c) up to 20% by weight of an amorphous copolyamide with units of hexamethylenediamine, terephthalic and isophthalic acids and, optionally, d) up to 20% by weight of a polyolefin modified with carboxyl groups.

25. A sausage ring comprising a shirred stick packaging casing as claimed in claim 11, the packaging casing being able to be filled with sausage meat on a stuffing horn without soaking in water.

* * * * *